United States Patent
Matsui (10) Patent No.: US 8,435,157 B2
(45) Date of Patent: May 7, 2013

(54) STROBOSCOPE DEVICE AND IMAGING DEVICE PROVIDED WITH THE SAME (75) Inventor: Yutaro Matsui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/512,970

(22) PCT Filed: Dec. 9, 2010

(86) PCT No.: PCT/JP2010/007157
§ 371 (c)(1),
(2), (4) Date: May 31, 2012

(87) PCT Pub. No.: WO2011/080880
PCT Pub. Date: Jul. 7, 2011

(65) Prior Publication Data
US 2012/0258837 A1  Oct. 11, 2012

(30) Foreign Application Priority Data
Dec. 28, 2009  (JP) ................................. 2009-297424

(51) Int. Cl.
*F16H 57/08* (2006.01)
(52) U.S. Cl.
USPC ........................................................ 475/343
(58) Field of Classification Search ............ 475/15, 475/16, 332, 343
See application file for complete search history.

(56) References Cited

U.S. PATENT DOCUMENTS

| | | | |
|---|---|---|---|
| 4,090,413 A * | 5/1978 | Vickland | 74/665 GB |
| 4,101,915 A * | 7/1978 | Lange | 396/197 |
| 5,079,574 A | 1/1992 | Ueno | |

FOREIGN PATENT DOCUMENTS

| JP | 63204238 A | 8/1988 |
|---|---|---|
| JP | 335533 U | 4/1991 |
| JP | 09023361 A | 1/1997 |
| JP | 2009075340 A | 4/2009 |

OTHER PUBLICATIONS

International Application Serial No. PCT/JP2010/007157, International Search Report mailed Feb. 15, 2011, 2 pgs.

* cited by examiner

Primary Examiner — Edwin A Young
(74) Attorney, Agent, or Firm — RatnerPrestia (57) ABSTRACT A stroboscope device can rotate a light emitting part about at least two axes by a drive mechanism. The drive mechanism includes a drive gear that rotates by a drive force transmitted from a drive source, a sun gear engaged with the drive gear, a planet gear engaged with the sun gear, a support member that rotatably supports the sun gear and the planet gear and is oscillatable around a rotation axis of the sun gear, at least two drive systems for rotating the light emitting part about at least two axes, and a positioner for restricting oscillation of the support member in a releasable manner in a state that the planet gear is engaged with one of transmission gears. The drive systems are disposed such that their transmission gears engage with the planet gear at positions different from one another with oscillation of the support member.

4 Claims, 8 Drawing Sheets

STROBOSCOPE DEVICE AND IMAGING DEVICE PROVIDED WITH THE SAME

This Application is a U.S. National Phase Application of Pct International Application PCT/JP2010/007157.

TECHNICAL FIELD

The present invention relates to stroboscope devices that can change the direction of a light emitting part by rotating it about at least two axes, and imaging devices provided with the same. More particularly, the present invention relates to stroboscope devices and imaging devices provided with the same that are suitable for so called bounce flash photography using indirect lighting by reflecting the light typically off a ceiling.

BACKGROUND ART

Conventionally, to obtain further natural images, a stroboscope device that has been proposed indirectly illuminates an object by emitting the light from the stroboscope device to a ceiling or wall to disperse the light. A light emitting part of the proposed stroboscope device rotates by a drive source such as a motor, and irradiation direction or irradiation coverage of light is adjustable in a stepless form (For example, refer to PTL 1 and PTL 2).

However, a stroboscope device disclosed in PTL 1 is provided with an ultrasonic motor on each rotation axis. A capacitor needs to be charged at high voltage with relatively small power in order to emit light in a continuous manner. Accordingly, power conservation is not feasible.

A stroboscope device disclosed in PTL 2 has a mechanism for driving a light source itself by two drive mechanisms in vertical and horizontal directions inside the light emitting part. This enlarges the size of the light emitting part due to a motor and a gear connected to it. A center of gravity becomes high when this stroboscope device is attached to an imaging device (camera) for use, making the imaging device imbalanced to grip.

CITATION LIST

Patent Literature

PTL1 Japanese Patent Unexamined Publication No. S63-204238
PTL2 Japanese Patent Unexamined Publication No. 2009-75340

SUMMARY OF THE INVENTION

A stroboscope device of the present invention includes a light emitting part that is rotatable about at least two axes by a drive mechanism. The drive mechanism includes a drive gear that rotates by a drive force transmitted from a drive source, a sun gear engaged with the drive gear, a planet gear engaged with the sun gear, a support member that rotatably supports the sun gear and planet gear and is also oscillatable around a rotation axis of the sun gear, at least two drive systems for rotating the light emitting part about at least two axes, and a positioner for restricting oscillation of the support member in a releasable manner in a state that the planet gear is engaged with one of the transmission gears. The drive systems have transmission gears at their input sides, respectively, and these transmission gears are disposed such that they are engaged with the planet gear at positions different from one another with oscillation of the support member.

The stroboscope device with this configuration rotates the light emitting part via the sun gear, planet gear, transmission gear, and drive system when the drive gear rotates in a state that the support member oscillates to engage the planet gear with the transmission gear. The light emitting part can also rotate about a different axis by releasing restriction by the positioner and oscillating the support member to a different position so that the planet gear engages with another transmission gear. In this way, the rotation of the light emitting part can be controlled in multiple directions using a single drive source by selectively driving at least two drive systems and switching the rotation axis of the light emitting part.

DESCRIPTION OF EMBODIMENTS

An exemplary embodiment of a stroboscope device of the present invention is described below with reference to drawings.

Figure 1A:
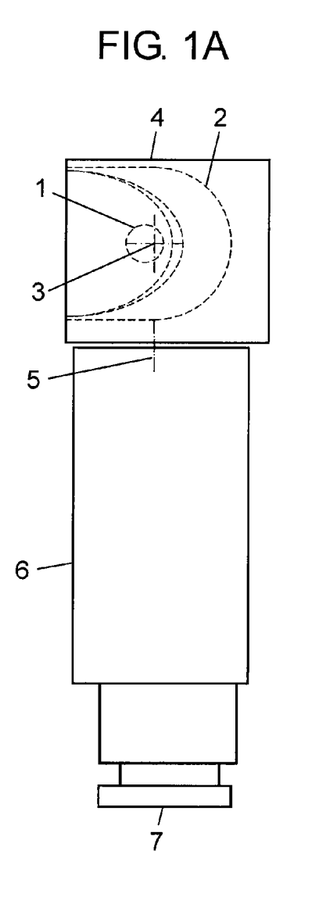
FIG. 1A is a side view of a stroboscope device in accordance with an exemplary embodiment of the present invention.
Figure 1B:
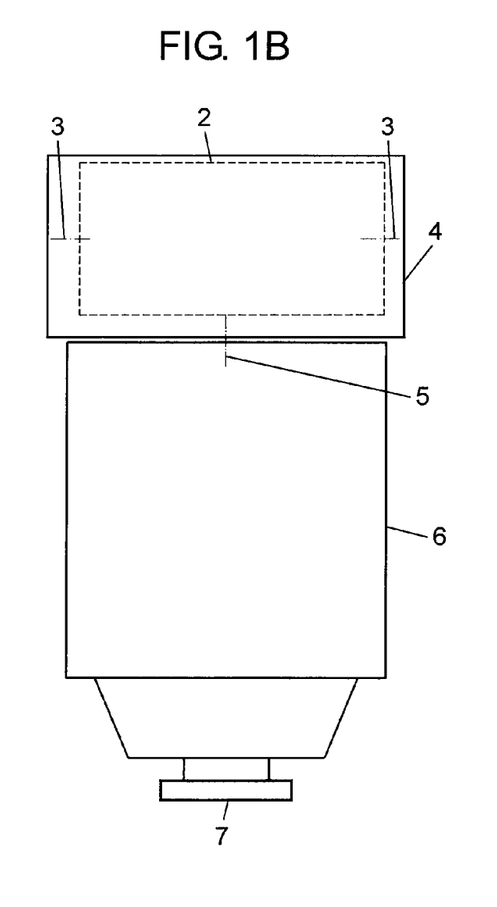
FIG. 1B is a front view of the stroboscope device in accordance with the exemplary embodiment of the present invention.

FIG. 1A is a side view of the stroboscope device in the exemplary embodiment. FIG. 1B is its front view. The stroboscope device includes light emitting part 2 in which light source 1 typically using a xenon discharge tube is housed, head 4 for rotatably supporting light emitting part 2 on horizontal rotation axis 3, and main body 6 rotatably supporting head 4 on vertical rotation axis 5 and housing circuits and power source. With this configuration, the stroboscope device can change the direction of light emitting part 2 vertically and horizontally. Main body 6 is attached to an imaging device (camera) for use by hot shoe 7 provided at the bottom of main body 6.

Figure 2A:
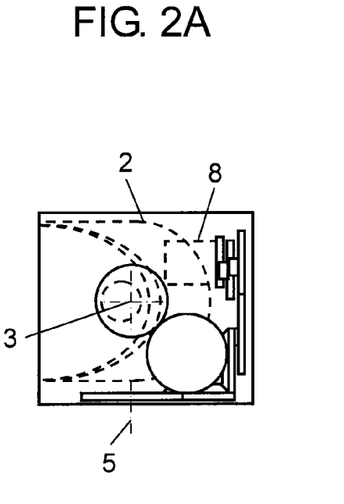
FIG. 2A is a magnified side view of a key part of a schematic configuration of a drive mechanism of the stroboscope device in accordance with the exemplary embodiment of the present invention.
Figure 2B:
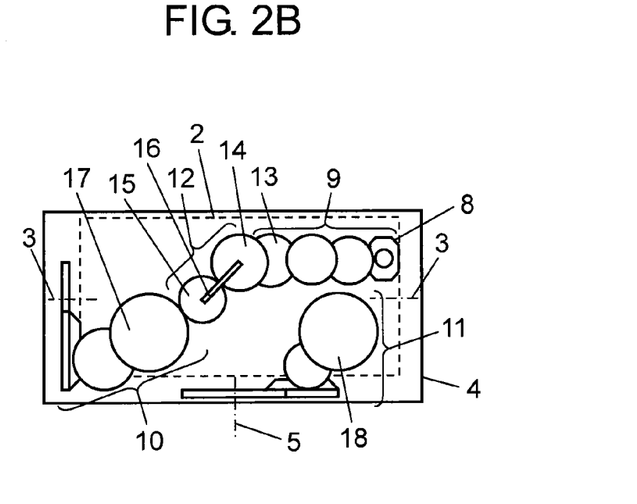
FIG. 2B is a magnified front view of a key part of the schematic configuration of the drive mechanism of the stroboscope device in the exemplary embodiment of the present invention.

FIG. 2A is a magnified side view of a schematic configuration of a key part of a drive mechanism in the stroboscope device. FIG. 2B is its front view. The drive mechanism is provided on head 4 for vertically rotating light emitting part 2, or horizontally rotating light emitting part 2 by horizontally rotating head 4 relative to main body 6. This drive mechanism roughly includes main drive system 9 connected to motor 8 as a drive source, first drive system 10 for vertically rotating light emitting part 2, second drive system 11 for horizontally rotating head 4, and switching unit 12 for switching transmission of drive force from motor 8 between first drive system 10 and second drive system 11.

Figure 3A:
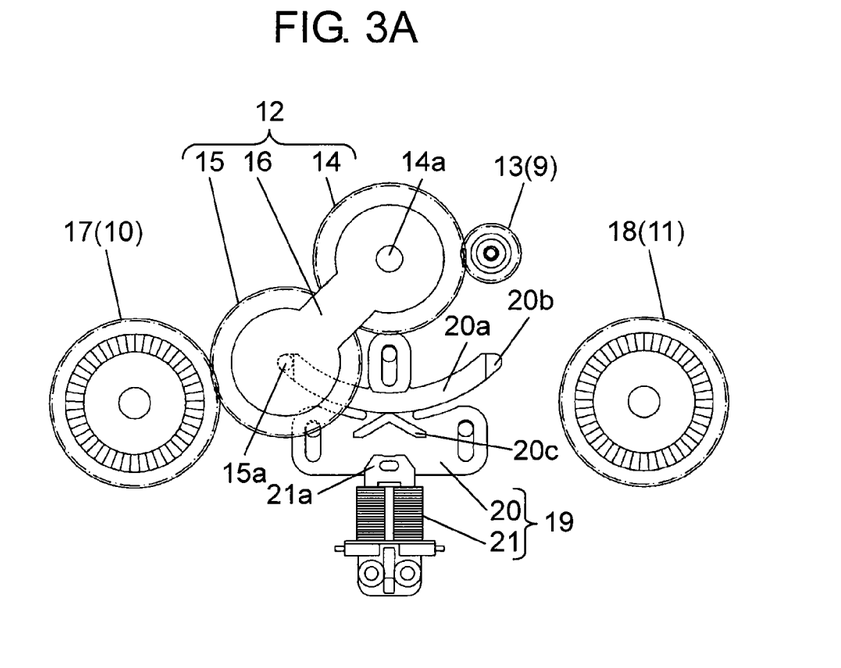
FIG. 3A is a magnified front view of a key part in a state that a switching unit of the drive mechanism is connected to a first drive system in the stroboscope device in accordance with the exemplary embodiment of the present invention.
Figure 3B:
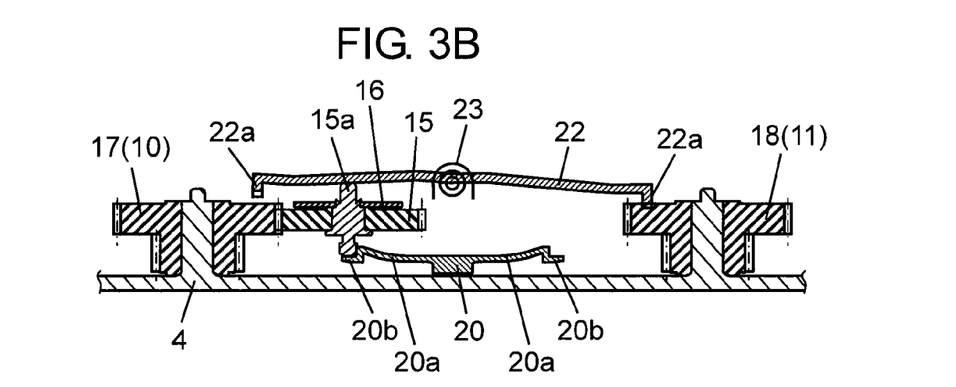
FIG. 3B is a magnified bottom view of a key part in the state that the switching unit of the drive mechanism is connected to the first drive system in the stroboscope device in accordance with the exemplary embodiment of the present invention.

FIG. 3A is a magnified front view of a key part of the drive mechanism. FIG. 3B is its bottom view. Main drive system 9 includes drive gear 13 at its output side. Switching unit 12 includes sun gear 14 engaged with drive gear 13, planet gear 15 engaged with sun gear 14, and support member 16 that supports rotations of sun gear 14 and planet gear 15 and is also oscillatable around rotation axis 14a of sun gear 14. First drive system 10 and second drive system 11 include transmission gears 17 and 18 at their input sides, respectively. Head 4 rotatably supports these drive gear 13, sun gear 14, and transmission gears 17 and 18.

The drive mechanism also includes positioner 19 for restricting oscillation of support member 16 in a releasable manner in a state that planet gear 15 is engaged with transmission gear 17 or 18. Positioner 19 includes regulating member 20 for restricting oscillation of support member 16 by locking rotation axis 15a of planet gear 15 in the oscillation direction of support member 16, and solenoid 21 as an actuator for moving regulating member 20 in a direction different from the oscillation direction of support member 16.

Support member 16 rotatably supports sun gear 14 with the thrust of a predetermined friction force. More specifically, a friction coil spring (not illustrated) is inserted between rotation axis 14a of sun gear 14 attached to support member 16 and sun gear 14. If sun gear 14 is rotated against the predetermined friction force, sun gear 14 rotates about rotation axis 14a. However, it is designed that if a rotative force is less than the predetermined friction force, sun gear 14 does not rotate about rotation axis 14a.

Regulating member 20 is slidable in the engaging direction of sun gear 14, and is connected to a movable piece 21a of solenoid 21. When power is applied to solenoid 21, movable piece 21a protrudes to move regulating member 20 toward sun gear 14. When power supply to solenoid 21 is stopped, movable piece 21a is designed to return to the position before the power is applied.

Regulating member 20 has resilient piece 20a that resiliently deforms by sliding contact of rotation axis (rotation axis of planet gear 15 attached to support member 16) 15a of planet gear 15 that oscillates in line with oscillation of support member 16. Resilient piece 20a has steps 20b on its both ends for locking rotation axis 15a in the oscillation direction of support member 16. More specifically, resilient piece 20a has arc shape conforming to a movement path of rotation axis 15a, and it displaces in a direction of pushing rotation axis 15a onto lock member 22 in the axial direction up to step 20b. At step 20b, rotation axis 15a depresses in a direction opposite to the displacement direction.

Furthermore, regulating member 20 has cam 20c for recovering to an original position upon sliding contact of rotation axis 15a of planet gear 15 that oscillates in a state that regulating member 20 is moved toward sun gear 14. This is detailed below. When regulating member 20 is at its normal position (a position separated from sun gear 14), rotation axis 15a of planet gear 15 is positioned on step 20b. In a state that power is applied to solenoid 21 and movable piece 21a protrudes to move regulating member 20 toward sun gear 14, resilient piece 20a displaces from the movement path of rotation axis 15a. Instead, cam 20c is positioned on the movement path of rotation axis 15a. If support member 16 oscillates in this state, rotation axis 15a of planet gear 15 slides and contact with cam 20c to push back regulating member 20 to return it to its original position.

A structure indicated by reference mark 22 is a lock member that is oscillatably supported by support part 23 and has engaging parts 22a on its both ends that are engaged with multiple grooves 18a (17a) in the circumferential direction on a surface of transmission gear 18 (17) on the opposite side of transmission gear 17 (18) engaged with planet gear 15. These engaging parts 22a restrict unintended rotation of transmission gear 18 (17) on the opposite side.

This is the configuration of the stroboscope device in the exemplary embodiment. Next, the switching operation of the drive system in this stroboscope device is described.

In FIGS. 3A and 3B, support member 16 is engaged with transmission gear 17 of first drive system 10. Accordingly, when drive gear 13 rotates, light emitting part 2 rotates via sun gear 14, planet gear 15, and first drive system 10. In this case, if sun gear 14 is rotated clockwise, no measure is necessary. If drive gear 13 rotates in a direction that it rotates sun gear 14 counterclockwise, support member 16 oscillates to the side of second drive system 11 (due to the predetermined friction force) in line with the rotation of sun gear 14 unless a measure is taken. Planet gear 15 thus separates from drive gear 17 of first drive system 10. However, since rotation axis 15a of planet gear 15 is locked in step 20b of resilient piece 20a of regulating member 20, rotation axis 15a of planet gear 15 is prevented from moving to the side of second drive system 11. Accordingly, engagement of planet gear 15 and transmission gear 17 is retained.

In this state, rotation axis 15a lifts up lock member 22 at the side of first drive system 10, and engaging part 22a at an end on the opposite side engages with transmission gear 18 of second drive system 11. Accordingly, the rotation of second drive system 11 is restricted.

Figure 4A:
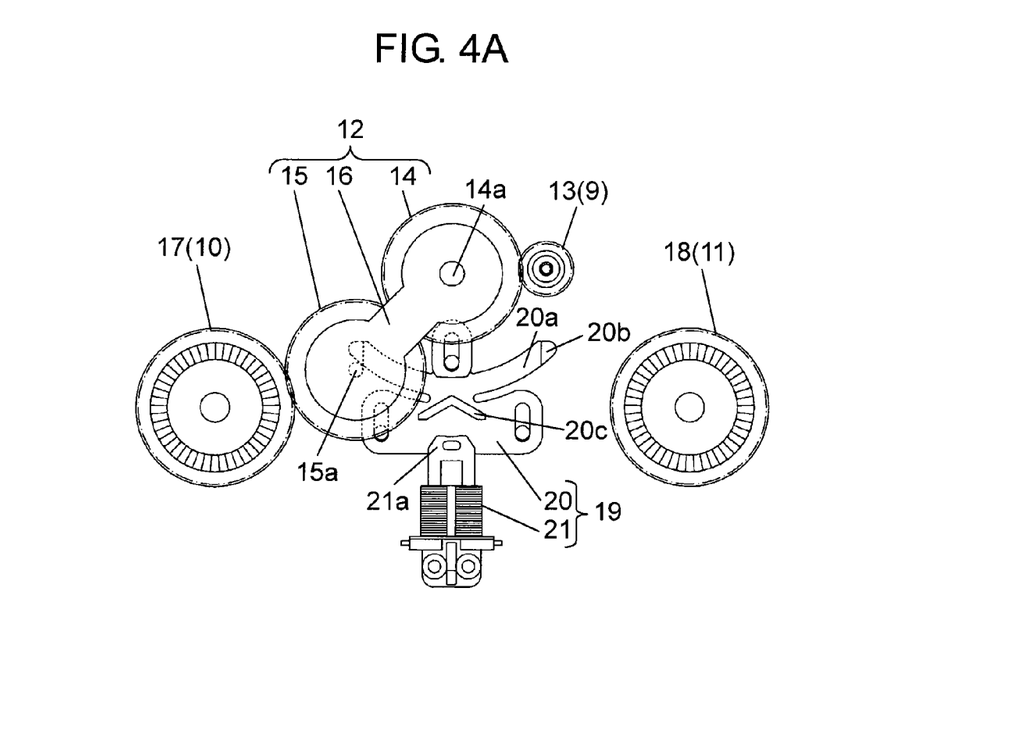
FIG. 4A is a magnified front view of a key part in a state that restriction of the switching unit of the drive mechanism is released in the stroboscope device in accordance with the exemplary embodiment of the present invention.
Figure 4B:
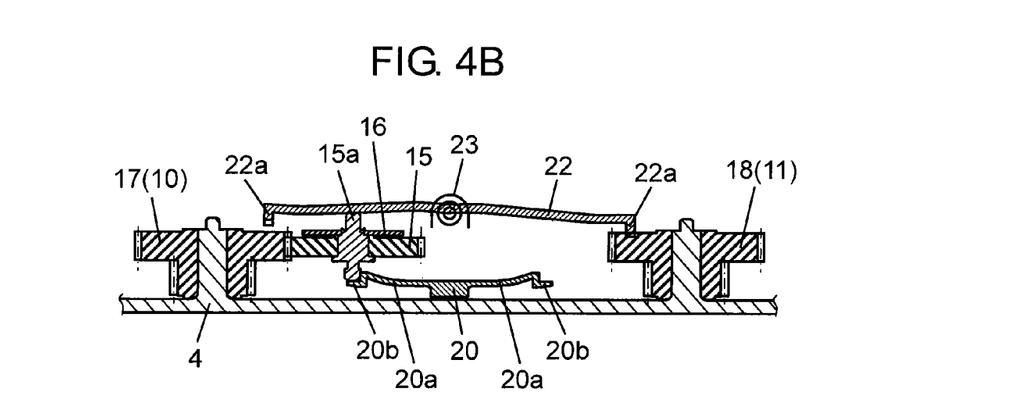
FIG. 4B is a magnified bottom view of a key part in the state that restriction of the switching unit of the drive mechanism is released in the stroboscope device in accordance with the exemplary embodiment of the present invention.

At this point, to change drive transmission from first drive system 10 to second drive system 11, power is first applied to solenoid 21 to release attachment of solenoid 21 and movable piece 21a. As shown in FIGS. 4A and 4B, since regulating member 20 is pushed toward sun gear 14 typically by a coil spring, movable piece 21a moves toward sun gear 14 by this spring force. Then, solenoid 21 moves regulating member 20 so that step 20b of resilient piece 20a of regulating member 20 comes off from rotation axis 15a of planet gear 15, allowing oscillation of support member 16. FIGS. 4A and 4B are magnified front view and its bottom view of a key part in a state that restriction of the switching unit of drive mechanism is released.

In the state that restriction of oscillation is released, if drive gear 13 and then sun gear 14 rotate, support member 16 oscillates to the side of second drive system 11 in line with this rotation because sun gear 14 and support member 16 are integrated by a predetermined friction force.

Figure 5A:
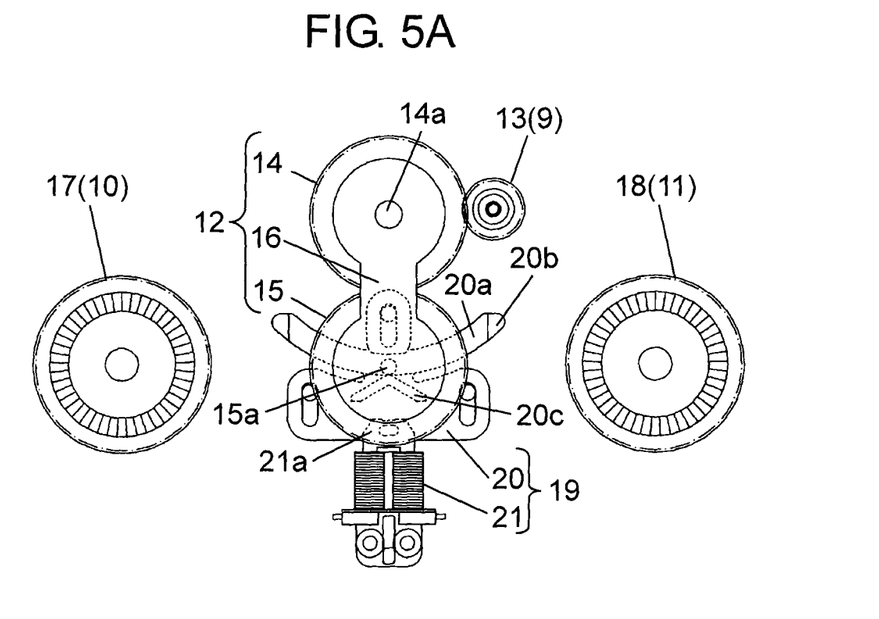
FIG. 5A is a magnified front view of a key part in a state that the switching unit of the drive mechanism is on the way of oscillation to switch to the second drive system in the stroboscope device in accordance with the exemplary embodiment of the present invention.
Figure 5B:
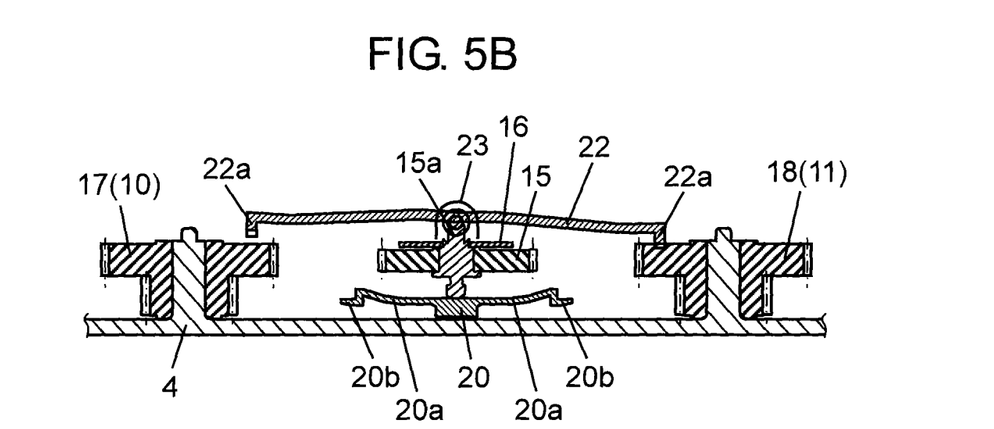
FIG. 5B is a magnified bottom view of a key part in the state that the switching unit of the drive mechanism is on the way of oscillation to switch to the second drive system in the stroboscope device in accordance with the exemplary embodiment of the present invention.

If support member 16 oscillates, rotation axis 15a of planet gear 15 slides on cam 20c by this oscillating movement. As shown in FIGS. 5A and 5B, regulating member 20 returns to its original position, and oscillation of support member 16 can be restricted again. FIGS. 5A and 5B are magnified front view and its bottom view of a key part in a state that the switching unit of the drive mechanism is on the way of oscillation to switch to the second drive system.

Figure 6A:
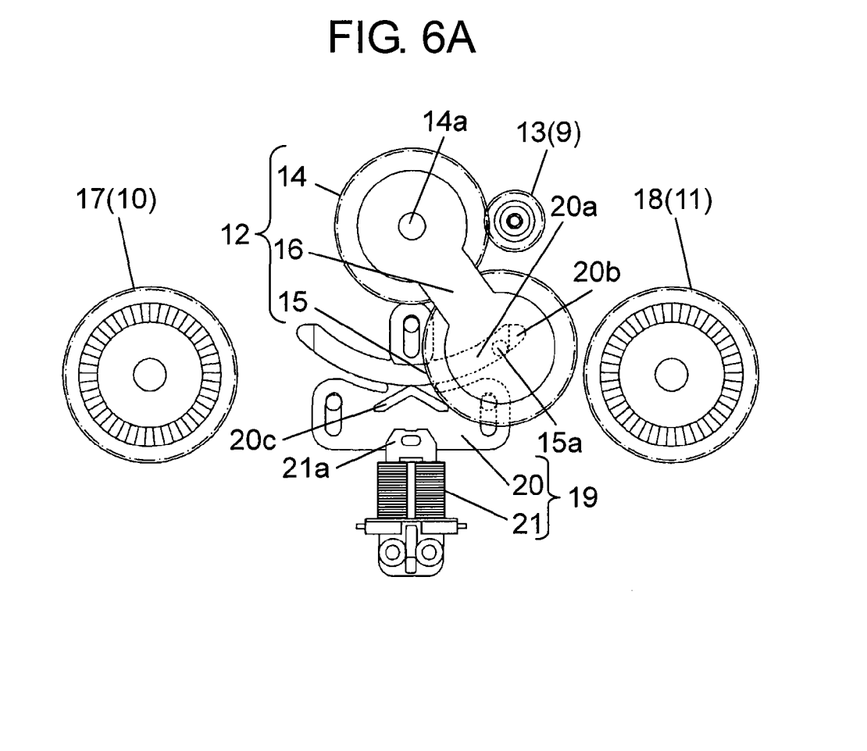
FIG. 6A is a magnified front view of a key part in a state that the switching unit of the drive mechanism is oscillated to just before the second drive system to switch to the second drive system in the stroboscope device in accordance with the exemplary embodiment of the present invention.
Figure 6B:
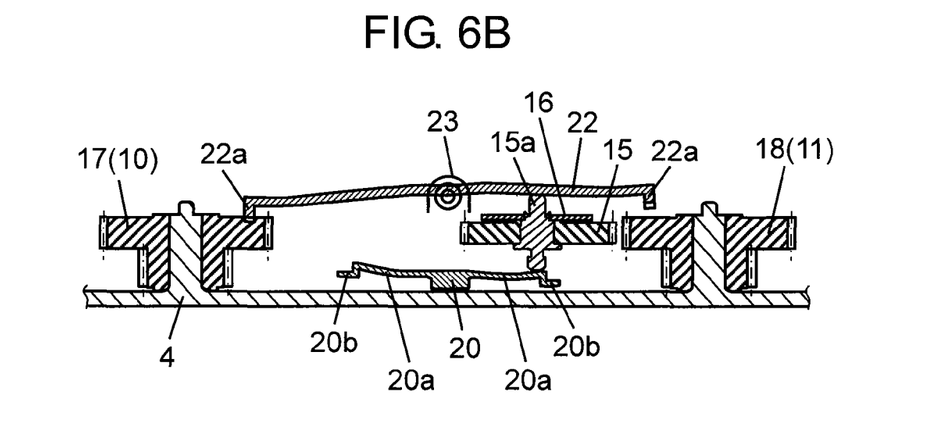
FIG. 6B is a magnified bottom view of a key part in the state that the switching unit of the drive mechanism is oscillated to just before the second drive system to switch to the second drive system in the stroboscope device in accordance with the exemplary embodiment of the present invention.
Figure 7A:
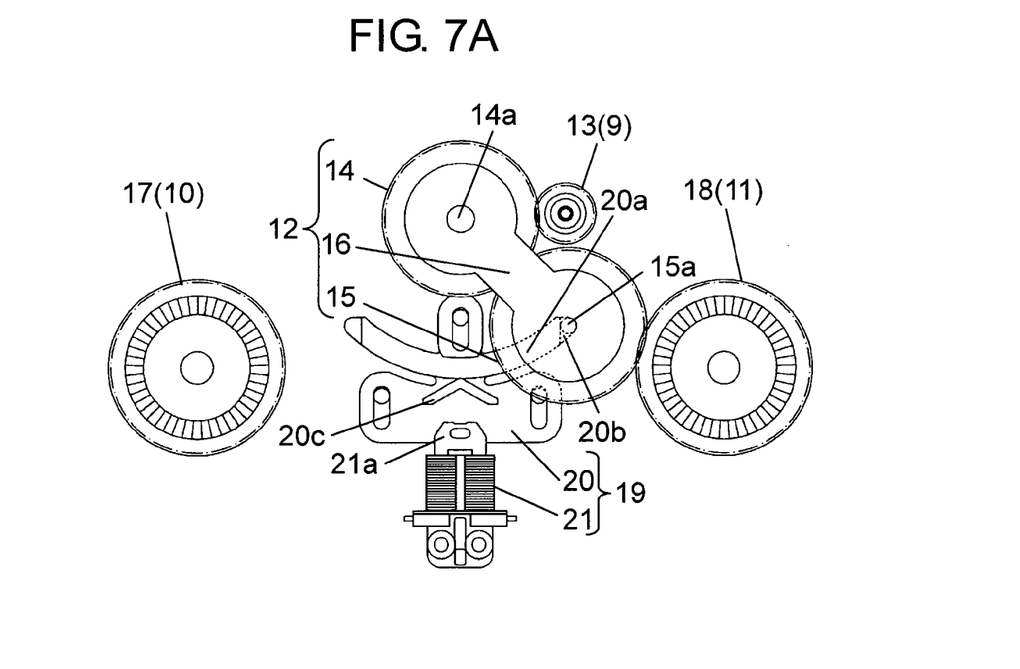
FIG. 7A is a magnified front view of a key part in a state that the switching unit of the drive mechanism is connected to the second drive system in the stroboscope device in accordance with the exemplary embodiment of the present invention.
Figure 7B:
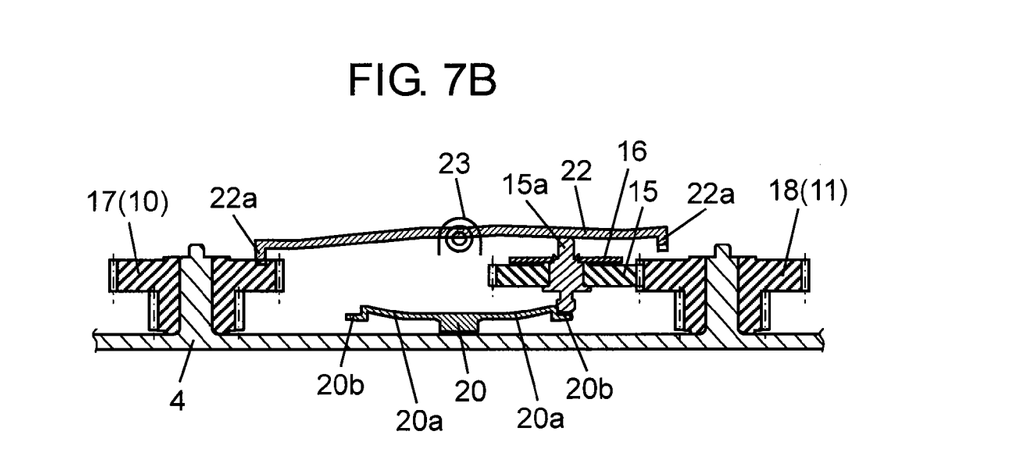
FIG. 7B is a magnified bottom view of a key part in the state that the switching unit of the drive mechanism is connected to the second drive system in the stroboscope device in accordance with the exemplary embodiment of the present invention.

When regulating member 20 returns to its original position, resilient piece 20a comes to the position under rotation axis 15a of planet gear 15. Accordingly, as shown in FIGS. 6A and 6B, if support member 16 further oscillates toward second drive system 11, rotation axis 15a of oscillating planet gear 15 slides on resilient piece 20a in a way such that rotation axis 15a presses down resilient piece 20a. FIGS. 6A and 6B are a magnified front view and its bottom view of a key part in the state that the switching unit of the drive mechanism is oscillated to just before the second drive system to switch to the side of second drive system. Then, as shown in FIGS. 7A and 7B, when rotation axis 15a reaches step 20b, rotation axis 15a of planet gear 15 depresses into step 20b of regulating member 20 by the recovery force of resilient piece 20a to try to recover to the original state, and movement to the side of first drive system 10 becomes restricted. Accordingly, engagement of planet gear 15 and transmission gear 18 is retained. FIGS. 7A and 7B are a magnified front view and its bottom view of a key part in the state that the switching unit of the drive mechanism is connected to the second drive system.

In this state, lock member 22 at the side of second drive system 11 is lifted up by rotation axis 15a, and engaging part 22a at an end to the side of first drive system 10 is engaged with transmission gear 17 of first drive system 10. The rotation of first drive system 10 is thus restricted.

The stroboscope device of the present invention can control the rotation of light emitting part 2 in multiple directions with one motor 8. Accordingly, the drive mechanism of light emitting part 2 can be simplified and downsized.

Figure 8:
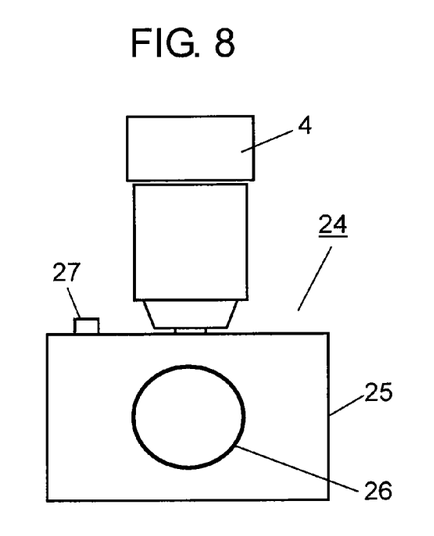
FIG. 8 is a front view of an exemplary embodiment of an imaging device equipped with the stroboscope device in the exemplary embodiment of the present invention.

Next, imaging device 24 equipped with the stroboscope device of the present invention is briefly described. FIG. 8 is a front view of a digital camera as an exemplary embodiment of imaging device 24. Imaging device 24 includes imaging device body 25, imaging lens 26, shooting start button 27, and the stroboscope device installed in imaging device body 25. The stroboscope device includes head 4 with built-in light emitting part 2. The drive mechanism described above enables adjustment of light emission from the stroboscope device in the horizontal and vertical directions. For example, when shooting start button 27 disposed in imaging device body 25 is pressed, the light emitted from the stroboscope device is reflected typically off a ceiling, and indirectly reaches an object (not illustrated). At the same time, the object image with appropriate luminance is captured on an imaging element through imaging lens 26. Imaging device 24 of the present invention can easily change the irradiation direction of light emitted to the object by installing the stroboscope device in the above exemplary embodiment.

Figure 9A:
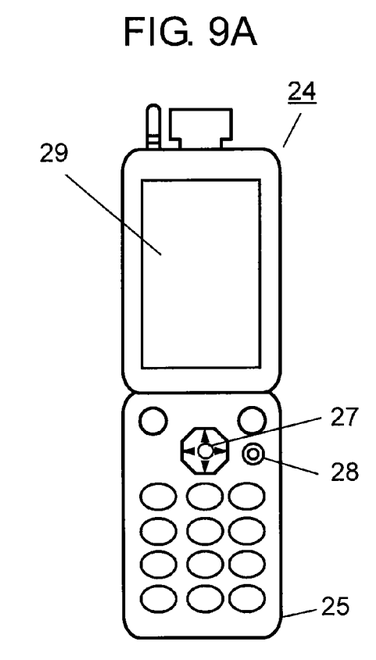
FIG. 9A is an appearance configuration of another exemplary embodiment of the imaging device equipped with the stroboscope device in accordance with the exemplary embodiment of the present invention.
Figure 9B:
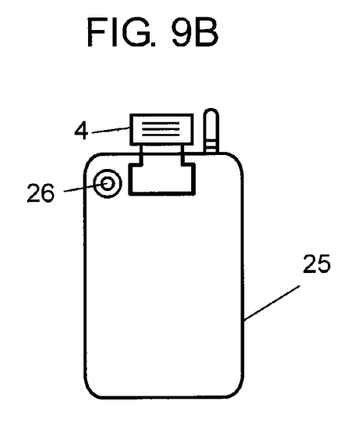
FIG. 9B is an appearance configuration of another exemplary embodiment of the imaging device equipped with the stroboscope device in accordance with the exemplary embodiment of the present invention.

FIGS. 9A and 9B show appearance configuration of a mobile phone with camera as another exemplary embodiment of imaging device 24. Imaging device 24 further includes camera button 28 for switching the mobile phone with camera to a camera mode, and LCD display 29 for displaying and confirming an object to be captured. Imaging lens 26 and the stroboscope device rotatably attached head 4 is installed at the back side of LCD display 29. During normal shooting, head 4 is housed in imaging device body 25. For strobe-shooting, head 4 rotates and appears over imaging device body 25. Same as the above digital camera, the irradiation direction of light emitted from the stroboscope device can be adjusted in the horizontal and vertical directions by the drive mechanism of light emitting part 2. When shooting start button 27 that also has a function to select a range of menus is pressed, shooting starts. As described above, the stroboscope device of the present invention can be easily downsized, and can also be installed in mobile devices such as a mobile phone with camera.

It is apparent that the stroboscopic device of the present invention is not limited to the above exemplary embodiment. The invention may be embodied in other forms without departing from the spirit thereof.

For example, in the above exemplary embodiment, transmission gear 17 of first drive system 10 and transmission gear 18 of second drive system 11 are disposed linearly symmetric relative to a line connecting sun gear 14 and positioner 19. However, the present invention is not limited to these positions. The number of drive systems is also not limited to two systems. There may be three or more.

In the above exemplary embodiment, transmission gear 17 of first drive system 10 and transmission gear 18 of second drive system 11 are disposed at the same distance from sun gear 14 in order to engage with planet gear 15 that orbits sun gear 14. However, two planet gears of planet gear 15 that engages with transmission gear 17 of first drive system 10 and planet gear 14 that engages with transmission gear 18 of second drive system 11 may be rotatably provided on support member 16. In this case, a distance of each transmission gear from the sun gear can be made different by changing the number of gears (diameter) of two planet gears. Or, two same planet gears may be used to provide the same distance from the sun gear to each transmission gear.

INDUSTRIAL APPLICABILITY

The stroboscope device of the present invention is applicable to purposes that require simplification and downsizing of the drive mechanism of the light emitting part by controlling the rotation of the light emitting part in multiple directions by a single drive source.

REFERENCE MARKS IN THE DRAWINGS

1 Light source
2 Light emitting part
3 Horizontal rotation axis
4 Head
5 Vertical rotation axis
6 Main body
7 Hot shoe
8 Motor
9 Main drive system
10 First drive system
11 Second drive system
12 Switching unit
13 Drive gear
14 Sun gear
14a Rotation axis
15 Planet gear
15a Rotation axis
16 Support member
17, 18 Transmission gear
17a, 18a Groove
19 Positioner
20 Regulating member
20a Resilient piece
20b Step
20c Cam
21 Solenoid (actuator)
21a Movable piece
22 Lock member
22a Engaging part
23 Support part
24 Imaging device
25 Imaging device body
26 Imaging lens
27 Shooting start button
28 Camera button
29 LCD display

The invention claimed is:

1. A stroboscope device in which a light emitting part is rotatable about at least two axes by a drive mechanism, the drive mechanism comprising:
 a drive gear that rotates by drive transmission from a drive source;
 a sun gear engaged with the drive gear;
 a planet gear engaged with the sun gear;
 a support member for rotatably supporting the sun gear and the planet gear, the support member being oscillatable around a rotation axis of the sun gear;
 at least two drive systems for rotating the light emitting part about at least two axes, the drive systems including a transmission gear on each of their input sides and so disposed that the transmission gears engage with the planet gear at positions different from one another with oscillation of the support member; and
 a positioner for restricting oscillation of the support member in a releasable manner in a state that the planet gear is engaged with one of the transmission gears,
 wherein:
 the support member rotatably supports the sun gear with thrust of a predetermined friction force; and the positioner includes a regulating member for restricting oscillation of the support member by locking a predetermined part of one of the support member and the planet gear in an oscillation direction of the support member, and an actuator for moving the regulating member in a direction different from the oscillation direction of the support member.

2. The stroboscope device of claim 1, wherein the regulating member includes a resilient piece that resiliently deforms upon receiving a sliding contact of the predetermined part of one of the support member and the planet gear in oscillating movement, the resilient piece including a step for locking the predetermined part in the oscillation direction of the support member.

3. The stroboscope device of claim 1, wherein the regulating member includes a cam for recovering to an original position upon receiving a sliding contact of one of the support member and the planet gear in oscillating movement.

4. An imaging device equipped with the stroboscope device of claim 1.

* * * * *